Figure 1:
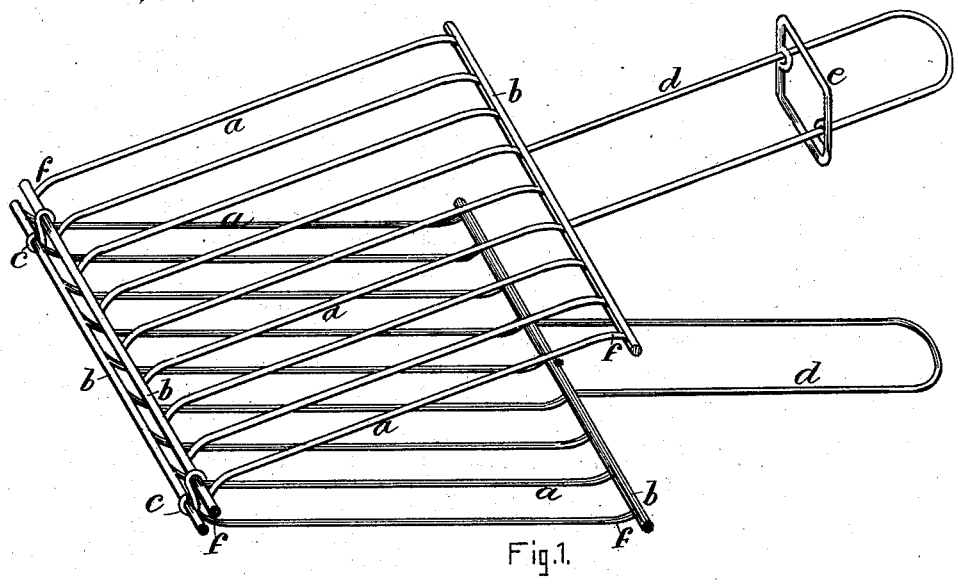

(No Model.) 2 Sheets—Sheet 1.

W. J. JOHNSON & J. H. BIGELOW.
Reversible Broiler or Toaster.

No. 237,286. Patented Feb. 1, 1881.

Witnesses.
H. E. Renick
Jas J Breach

Inventors.
William J. Johnson
Jonah H. Bigelow
by A. H. Spencer,
attorney (No Model.) 2 Sheets—Sheet 2.

W. J. JOHNSON & J. H. BIGELOW.
Reversible Broiler or Toaster.

No. 237,286. Patented Feb. 1, 1881.

Witnesses.
H. E. Kennick
Jos. J. Breach

Inventors.
William J. Johnson
Jonah H. Bigelow
by A. H. Stuart
attorney

UNITED STATES PATENT OFFICE.

WILLIAM J. JOHNSON, OF NEWTON, AND JONAH H. BIGELOW, OF WORCESTER, ASSIGNORS TO NATIONAL MANUFACTURING COMPANY, OF BOSTON, MASSACHUSETTS.

REVERSIBLE BROILER OR TOASTER.

SPECIFICATION forming part of Letters Patent No. 237,286, dated February 1, 1881.

Application filed December 17, 1880. (No model.)

*To all whom it may concern:*

Be it known that we, WILLIAM J. JOHNSON, of Newton, Massachusetts, and JONAH H. BIGELOW, of Worcester, Massachusetts, have jointly invented certain new and useful Improvements in Reversible Broilers or Toasters; and we do hereby declare the following to be a full, clear, and exact description of the invention, such as will enable others skilled in the art to which it appertains to make and use the same, reference being had to the accompanying drawings, and to letters or figures of reference thereon, which form a part of this specification.

This invention relates to the class of reversible broilers or toasters having two similar gratings or barred wings united at one end or side by rings or links, and provided at the opposite end or side with projecting handles and a slide to hold the wings together.

The object of this improvement is to produce a reversible broiler having a greater space between its wings when folded in one direction than when folded in the other, with a permanently-attached device operating as a lock in either case, so as to receive and hold tightly in one position or the other articles differing materially in their thickness.

Heretofore reversible broilers furnished with a slide adapted to secure the wings when folded either way have gained no advantage from reversing, but have presented an equal space between the wings with either direction of folding. Examples of such construction are shown in the patents to Dudley, dated April 6 and April 13, 1875, and that to Sherwood and Dudley, dated December 15, 1874.

Our improvement, as applied to such broilers as are set forth in said patents, consists in giving their parallel bars an offset at or near each end, about as shown, so as to deflect the several bars of each wing bodily toward or from those of the other wing, increasing or diminishing the space between said wings, as the case may be. The same is true concerning the so-called "riveted broilers," made, for fifty years, reversible, without advantage. The bars may be bent, as already explained, or the offset may be gained in this case and a like result attained by drilling the broad end frames along one edge, and uniting in a broiler two grates having straight bars thus thrown out of a central position. Similarly the existing single-locking wire broilers, (shown in the patents to H. A. Hildreth and W. J. Johnson, April 18, 1865, and W. F. Collier and J. H. Bigelow, March 24, 1868,) having wire end frames with the several straight grate-bars running outside thereof and clinched thereto, are provided under our invention with a locking device adapted to engage both the handles when the broiler is turned either side out. The variation in space gained in such case, by reversing the wings, will be equal to four times the thickness of the wire forming the grate-bars and end frames, and will be abundant for all ordinary purposes. Should greater variation be desired, the end frames may have corrugations extending outwardly at the points where the parallel bars are secured thereon, or inwardly where the links unite the wings.

The drawings represent these various forms of broilers, each embodying our invention.

Figure 2:
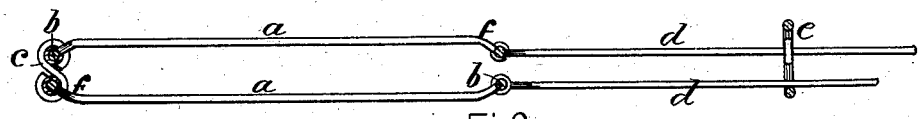
Figure 4:
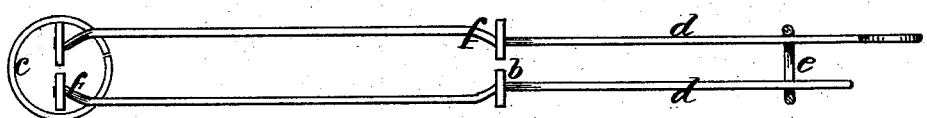
Figure 5:
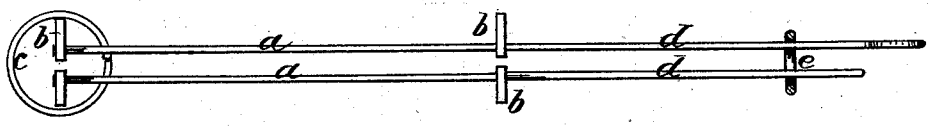
Figure 6:
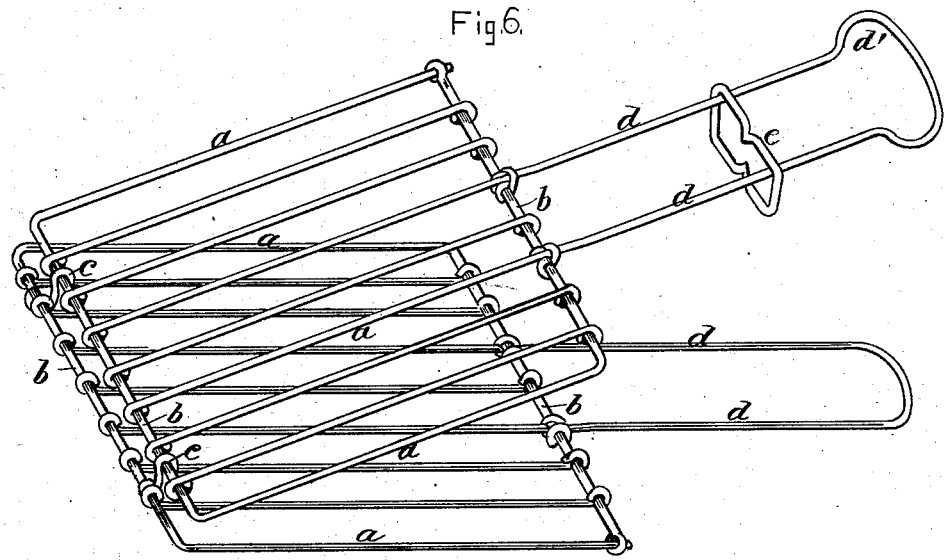
Figure 7:
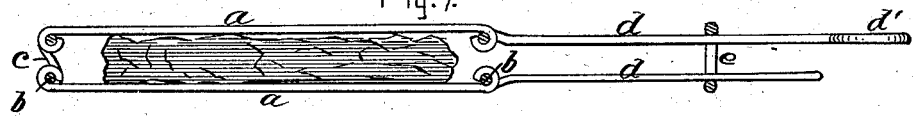
Figure 8:
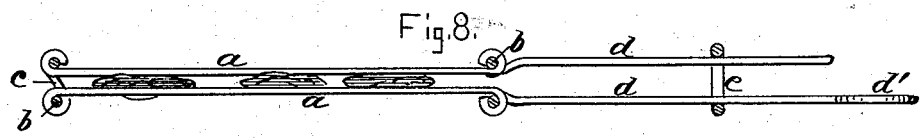
Figure 9:
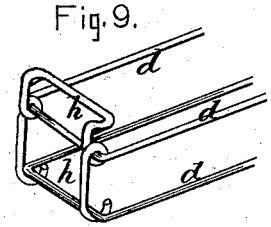

Figure 1 is a perspective view of the device shown in the Sherwood and Dudley patent with our improvement applied thereto; Fig. 2, a longitudinal section of the same, showing clearly the offsets near each end of each bar; and Fig. 3, a view of the same reversed. Figs. 4 and 5 show the old riveted broiler as improved by our invention. Fig. 6 shows, in perspective, the ordinary wire broiler with our improvement, enabling the utensil to be reversed and locked with material variation in capacity. Figs. 7 and 8 show the same, contrasted, as in actual use; and Fig. 9 illustrates a variable fastening for the handle ends, if desired, to correspond with the positions of the wings.

In the drawings, *a a* are the parallel bars of each grate or wing; *b b*, the end frames, to which each bar *a* is secured; and *c c*, the links uniting the wings loosely at one end or side. At the opposite end or side each wing has two of its parallel bars extended to form a handle, *d*, and a locking device, *e*, is secured upon one of said handles, adapted to engage both the handles when the broiler is turned either side out.

It is essential to our invention that the broiler be reversible, and be provided with a lock adapted to secure the wings in either folded position, and that when folded in one direction and locked there shall be a materially greater space between the working faces of the wings than when folded in the other direction and locked, so as to adapt the utensil to receive and hold tightly, in one or the other of its positions, articles differing very considerably in their thickness. Figs. 7 and 8 illustrate this varying capacity, the same implement being adapted to hold a very thick steak, or a thin slice of bread, or a number of oysters, and permit turning repeatedly without dropping them.

Figure 3:
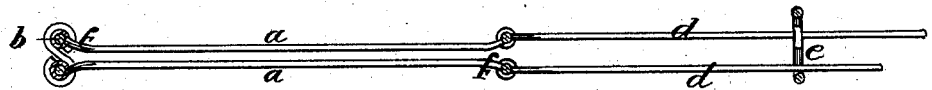

In broilers of the construction shown in Figs. 1, 2, and 3 we gain the desired variation in space by giving to the several bars $a$ of each wing an offset, $f$, at each end sufficient to deflect bodily the sides of each wing in opposite directions, so that while the body of each bar $a$, between the offsets $f$, is straight, and the distance between the end frames, $b\ b$, of the opposite wings is uniform, the bars $a$ are, in the one case, quite widely separated, and in the other quite near together. The same construction and effect are shown in Figs. 4 and 5, which represent the old style of riveted broiler with our improvement applied in the two ways already referred to.

In Figs. 6, 7, and 8 the end frames, $b$, are of wire, and the ends of the straight bars $a$ pass around and are clinched upon them, while the locking-slide $e$ will secure the wings together when folded either way.

In Fig. 9 the handles $d$ are of equal length and bent square across at the outer ends. Upon one of these ends a double hook, $h$, is pivoted, so that either of its ends may engage with the opposite handle when folded either way, varying, further, the capacity of the utensil.

We claim as of our invention—

1. A reversible wire broiler consisting of two grated wings loosely linked together at one end, and having their parallel bars offset at or near each end frame, as described, in combination with projecting handles on said wings, and a locking device therefor adapted to lock said handles and wings when folded either way, for the purpose set forth.

2. A reversible broiler having its parallel bars farther apart when folded one way than when reversed, and provided with projecting handles and a permanently-attached locking device adapted to secure such handles in both of their folded positions, for the purpose set forth.

3. A locking device for broiler-handles, such device being adapted to secure said handles at different distances from each other, so as to vary the capacity of the utensil, for the purpose set forth.

In testimony whereof we affix our signatures in presence of two witnesses.

WILLIAM J. JOHNSON.
JONAH H. BIGELOW.

Witnesses:
A. H. SPENCER,
C. G. KEYES.